(12) United States Patent
Kumhyr et al.

(10) Patent No.: US 7,457,113 B2
(45) Date of Patent: Nov. 25, 2008

(54) VENTURI BERNOULLI HEAT EXTRACTION SYSTEM FOR LAPTOP COMPUTERS

(75) Inventors: David Bruce Kumhyr, Austin, TX (US); Kenneth Alexander McKethan, Jr., Dunn, NC (US); Ragunathan Srinivasan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 11/548,441

(22) Filed: Oct. 11, 2006

(65) Prior Publication Data

US 2008/0089023 A1   Apr. 17, 2008

(51) Int. Cl.
*H05K 5/00* (2006.01)
*H05K 7/20* (2006.01)

(52) U.S. Cl. .................. 361/687; 361/690; 361/692; 361/694; 361/695; 165/80.3

(58) Field of Classification Search ................. 361/687, 361/690–695, 697; 165/80.3; 454/184
See application file for complete search history.

(56) References Cited

U.S. PATENT DOCUMENTS

| | | | |
|---|---|---|---|
| 6,226,180 B1 * | 5/2001 | Ueda et al. | 361/689 |
| 6,253,834 B1 * | 7/2001 | Sterner | 165/80.3 |
| 6,365,296 B1 | 4/2002 | Young | |
| 6,397,927 B1 * | 6/2002 | Sterner | 165/80.3 |
| 6,397,928 B1 * | 6/2002 | Sterner | 165/80.3 |
| 6,397,929 B1 * | 6/2002 | Sterner | 165/80.3 |
| 6,397,930 B1 * | 6/2002 | Sterner | 165/80.3 |
| 6,435,267 B1 * | 8/2002 | Sterner | 165/96 |
| 6,469,892 B2 * | 10/2002 | Ueda et al. | 361/687 |
| 6,474,409 B1 * | 11/2002 | Sterner | 165/96 |
| 6,507,493 B2 * | 1/2003 | Ueda et al. | 361/704 |
| 6,717,808 B2 * | 4/2004 | Ueda et al. | 361/695 |
| 6,816,371 B2 * | 11/2004 | Agata et al. | 361/687 |
| 7,028,753 B2 * | 4/2006 | Sterner | 165/80.3 |
| 7,312,988 B2 * | 12/2007 | Maeda | 361/687 |
| 2002/0179286 A1 | 12/2002 | Sterner | |

(Continued)

FOREIGN PATENT DOCUMENTS

JP          61294528 A1     12/1986

(Continued)

*Primary Examiner*—Jayprakash N Gandhi
*Assistant Examiner*—Robert J Hoffberg
(74) *Attorney, Agent, or Firm*—Duke W. Yee; Jeffrey S. La Baw; Francis Lammes

(57) ABSTRACT

A heat extraction system is provided for a laptop computer that comprises a system unit that includes a set of heat sources and a video display unit that is movably attached to the system unit. The laptop computer has air inlets and air outlets that allow air to flow into the system unit, over the heat sources forming heated air, and exhaust the heated air. The laptop computer has a set of tubes, which have an inlet and an outlet, located behind a video display in the video display unit and an air connection from the air outlets to each inlet in the tubes. The set of tubes are formed such that heated air passing through a constriction in the set of tubes changes in velocity and pressure in order to satisfy the conservation of flow rate. Thus, heat produced by the heat sources is extracted from the laptop computer.

20 Claims, 3 Drawing Sheets

U.S. PATENT DOCUMENTS

| | | | |
|---|---|---|---|
| 2004/0223299 A1* | 11/2004 | Ghosh | 361/687 |
| 2005/0057899 A1 | 3/2005 | Lord | |
| 2006/0133032 A1* | 6/2006 | Uchida et al. | 361/687 |

FOREIGN PATENT DOCUMENTS

| | | | |
|---|---|---|---|
| JP | 04048693 A * | 2/1992 | |
| JP | 11008485 A1 | 1/1999 | |
| JP | 2000199500 A1 | 7/2000 | |

* cited by examiner

VENTURI BERNOULLI HEAT EXTRACTION SYSTEM FOR LAPTOP COMPUTERS

BACKGROUND OF THE INVENTION

1. Field of the Invention

The present invention relates generally to computer system heat extraction. More specifically, the present invention is related to an apparatus for extracting heat from a laptop computer using Venturi Bernoulli heat extraction.

2. Description of the Related Art

A laptop or notebook computer system has many components that produce large amounts of heat during operation, including, but not limited to the central processing unit (CPU), chipset, graphics card, and hard drives. This heat must be dissipated in order to keep these components within their safe operating temperatures, and both manufacturing methods and additional parts are used to keep the heat at a safe level.

The heat sink itself performs two entirely separate functions, both of which are necessary to a central processing unit's ongoing good health. First, the heat sink acts as a large thermal mass which absorbs heat and stabilizes the central processing unit's temperature. The heat sink aspect does not reduce or increase the central processing unit. The heat sink simply stops the central processing unit's temperature from changing too quickly. Secondly, the heat sink acts as a heat dissipater. The heat sink is designed to have a large total surface area and to conduct heat well, so the whole surface of the heat sink gets hot. The weakness of this entire arrangement is the poor transfer of heat from the heat sink to the air, thus, the large surface area of the heat sink attempts to compensates for the poor heat transfer.

Currently, to increase the transfer of heat from the heat sink to the air, fans are added to the laptop or notebook computer to speed up the exchange of air heated by the computer parts for cooler ambient air. However, cooling computer components that produce large amounts of heat during operation is an ongoing issue especially within a laptop or notebook computer.

SUMMARY OF THE INVENTION

The illustrative embodiments provide a laptop computer that comprises a system unit, which includes a set of heat sources and a video display unit that is movably attached to the system unit. The illustrative embodiments provide a set of air inlets and a set of air outlets on the system unit. The set of air inlets allows air to flow into the system unit, over the heat sources within the system unit to form heated air, and the set of air outlets allows the heated air to flow out of the system unit. The illustrative embodiments provide a set of tubes located behind a video display within the video display unit. Each tube in the set of tubes has an inlet and an outlet in the video display unit. The illustrative embodiments provide an air connection that connects the set of air outlets to each inlet in the set of tubes. The set of tubes have a form such that heated air passing through a constriction in the set of tubes changes in velocity and pressure in order to satisfy conservation of flow rate. The heated air produced by the set of heat sources is extracted from the laptop computer through each outlet in the set of tubes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
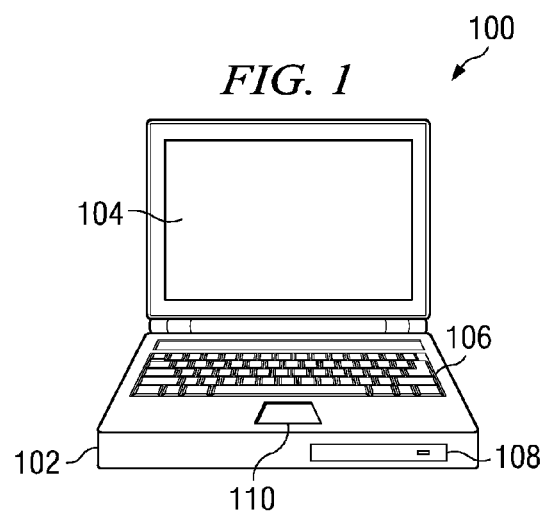
FIG. 1 depicts a pictorial representation of a data processing system in which the illustrative embodiments may be implemented.

The illustrative embodiments provide for extracting heat from a laptop computer using Venturi Bernoulli heat extraction. A laptop computer may also be known as a notebook computer or a mobile computer. With reference now to the figures, and in particular with reference to FIG. 1, a pictorial representation of a data processing system in which illustrative embodiments may be implemented is depicted. Mobile computer 100 is depicted which includes system unit 102, video display terminal 104, keyboard 106, storage devices 108, which may include floppy drives and other types of permanent and removable storage media, and pointer device 110. Additional input devices may be included with mobile computer 100, such as, for example, a mouse, joystick, touch screen, trackball, microphone, and the like. Mobile computer 100 may be implemented using any suitable computer, such as an IBM Thinkpad computer, which is a product of International Business Machines Corporation, located in Armonk, N.Y. Mobile computer 100 also preferably includes a graphical user interface (GUI) that may be implemented by means of systems software residing in computer readable media in operation within mobile computer 100.

Figure 2:
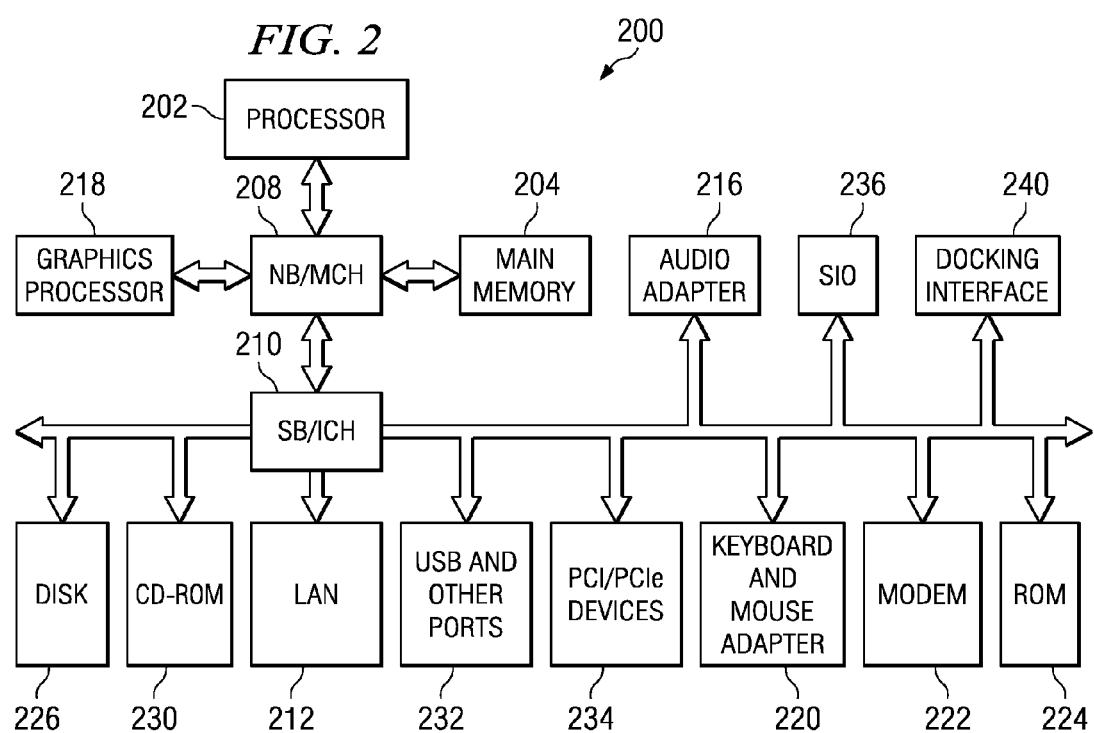
FIG. 2 shows a block diagram of a data processing system in which the illustrative embodiments may be implemented.

With reference now to FIG. 2, a block diagram of a data processing system is shown in which the illustrative embodiments may be implemented. Data processing system 200 is an example of a mobile computer, such as mobile computer 100 in FIG. 1, in which code or instructions implementing the processes for different embodiments may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 may be connected to input/output (I/O) controller hub 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to input/output (I/O) controller hub 210.

Docking interface 240 may also be connected to input/output (I/O) controller hub 210. Data processing system 200 may be a mobile computing device, such as a laptop computer or handheld computer. Docking interface 240 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 202 and is used to coordinate and provide control of various components within data processing system 200 in FIG. 2. The operating system may be a commercially available operating system, such as Windows® XP, which is available from Microsoft Corporation. Instructions for the operating system, the object-oriented programming system, and applications or programs are located on storage devices, such as hard disk drive 226 and may be loaded into main memory 204 for execution by processor 202.

Those of ordinary skill in the art will appreciate that the hardware in FIG. 2 may vary depending on the implementation. Other internal hardware or peripheral devices, such as flash memory, equivalent nonvolatile memory, or optical disk drives and the like, may be used in addition to or in place of the hardware depicted in FIG. 2. Also, the processes of the depicted embodiments may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations.

The illustrative embodiments use the Bernoulli principle to provide a chimney-like heat extractor with venturis extending up the back of the LCD screen. Using Venturi Bernoulli heat extraction may augment or replace the fan drawing air over the heat sink that sits on top of the central processing unit.

Figure 3:
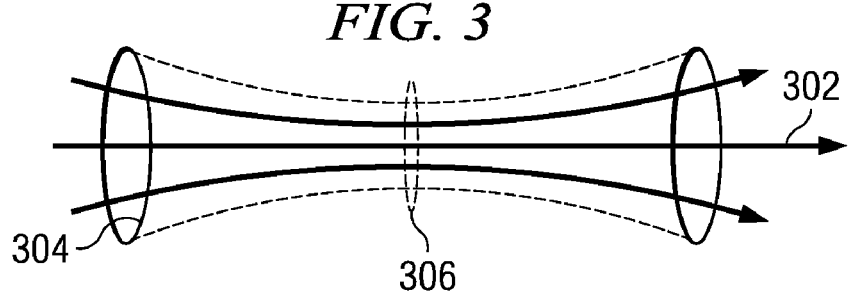
FIG. 3 depicts a chimney-like heat extractor using the Venturi effect in accordance with an illustrative embodiment.

FIG. 3 depicts a chimney-like heat extractor using the Venturi effect in accordance with an illustrative embodiment. The Venturi effect is a special case of Bernoulli's principle, in the case of air 302 flowing through tube 304 with constriction 306 in tube 304. Air 302 must speed up in constriction 306, reducing air's 306 pressure and producing a partial vacuum via the Bernoulli effect. The illustrative embodiments may use a set of tubes which may be one or more tubes.

Air 302 passing through constriction 306 is subject to changes in velocity and pressure in order to satisfy the conservation of mass-flux or flow rate. The reduction in pressure in constriction 306 can be understood by conservation of energy: air 302 gains kinetic energy as it enters constriction 306, and that energy is supplied by a pressure gradient force from behind. The pressure gradient reduces the pressure in constriction 306 in reaction to the acceleration. Likewise, as air 302 leaves constriction 306, air 302 is slowed by a pressure gradient force that raises the pressure back to the ambient level.

The limiting case of the Venturi effect is choked flow in which constriction 306 in tube 304 limits the total flow rate through tube 304 because the pressure cannot drop below zero in constriction 306. As an example of dimensions for tube 304, the outer ends may be 1 centimeter while the constricted portion of tube 304 may be 0.25 centimeters, although any dimension may be used as long as the tube fits adequately behind the video display terminal of the laptop computer and provides air flow. Tube 304 may be manufactured out of a number of different materials, such as high temperature rubber, a material similar to the housing of the display, or aluminum, which may provide strength as well as additional heat dissipation.

Figure 4:
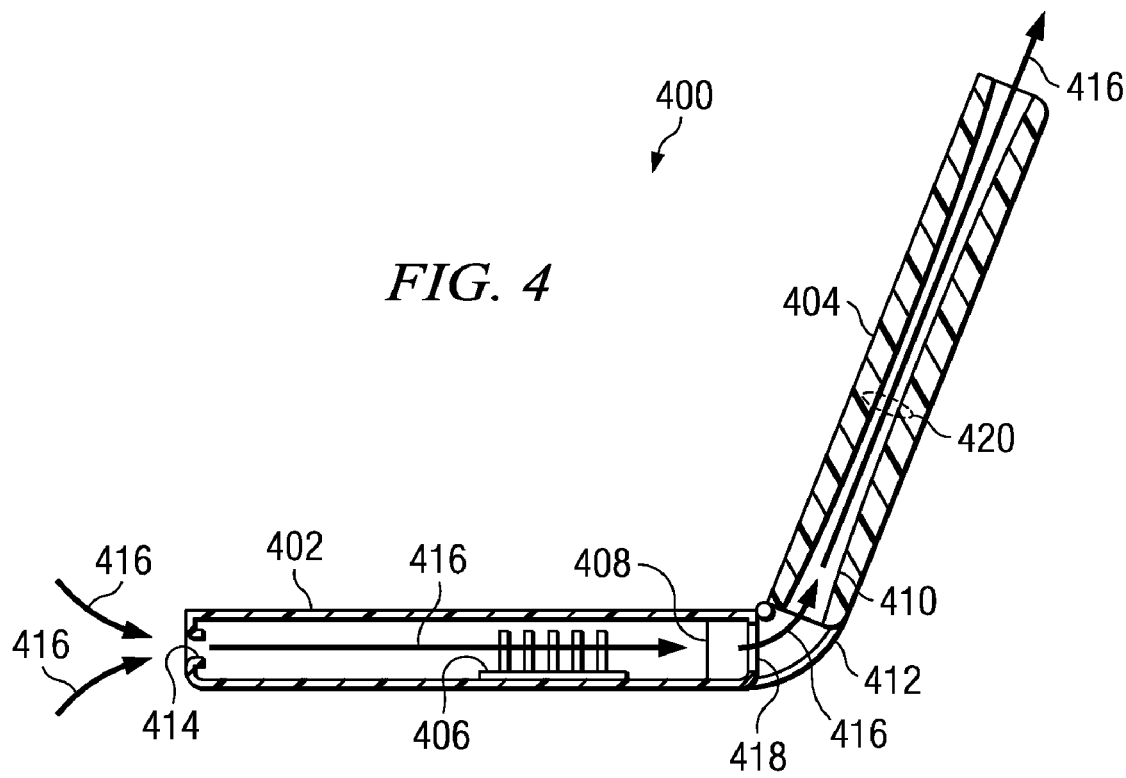
FIG. 4 depicts a side view of a laptop computer using a Venturi Bernoulli heat extraction system in accordance with an illustrative embodiment.

FIG. 4 depicts a side view of a laptop computer using a Venturi Bernoulli heat extraction system in accordance with an illustrative embodiment. Laptop computer 400 may be a laptop, notebook, or mobile computer, such as mobile computer 100 of FIG. 1. Laptop computer 400 is comprised of system unit 402 and video display terminal 404. System unit 402 comprises central processing unit (CPU) 406 and fan 408 used to draw air over a heat sink that sits on top of central processing unit 406 as well as other internal components of system unit 402 forming heated air. While the illustrative embodiments use fan 408, one or more fans may be used to comprise a set of fans. While the illustrative embodiments show one of central processing unit 406, system unit 402 may contain one or more central processing units. The illustrative embodiments provide a Venturi Bernoulli heat extraction system that is comprised of chimney 410 and hinge duct 412. Chimney 410 may be one or more chimneys or tubes using the Venturi effect as described in FIG. 3 and are located behind video display terminal 404.

System unit 402 may comprise a set of air inlets that may be one or more air inlets 414 where air 416 is drawn in over the internal components inside of system unit 402 to cool the internal components. Fan 408 may draw air 416 over the internal components of system unit 402, such as central processing unit 406 and exhaust air 416 through air outlet 418. The illustrative embodiments use a set of air outlets that may be one or more air outlets. The illustrative embodiments draw air 416 through hinge duct 412 and then through chimney 410. While the illustrative embodiments show hinge duct 412 that provides a connection from air outlet 418 to chimney 410, any type of connection may be used, such as an expandable/collapsible tube as long as the connection is able to conduct air from air outlet 418 to chimney 410 such that a pressure gradient is present.

Air 416 passing through constriction 420 is subject to changes in velocity and pressure in order to satisfy the conservation of mass-flux or flow rate. The reduction in pressure in constriction 420 can be understood by conservation of energy: air 416 gains kinetic energy as it enters constriction 420, and that energy is supplied by a pressure gradient force from behind. The pressure gradient reduces the pressure in constriction 420 in reaction to the acceleration. Likewise, as air 416 leaves constriction 420, air 416 is slowed by a pressure gradient force that raises the pressure back to the ambient level.

Figure 5:
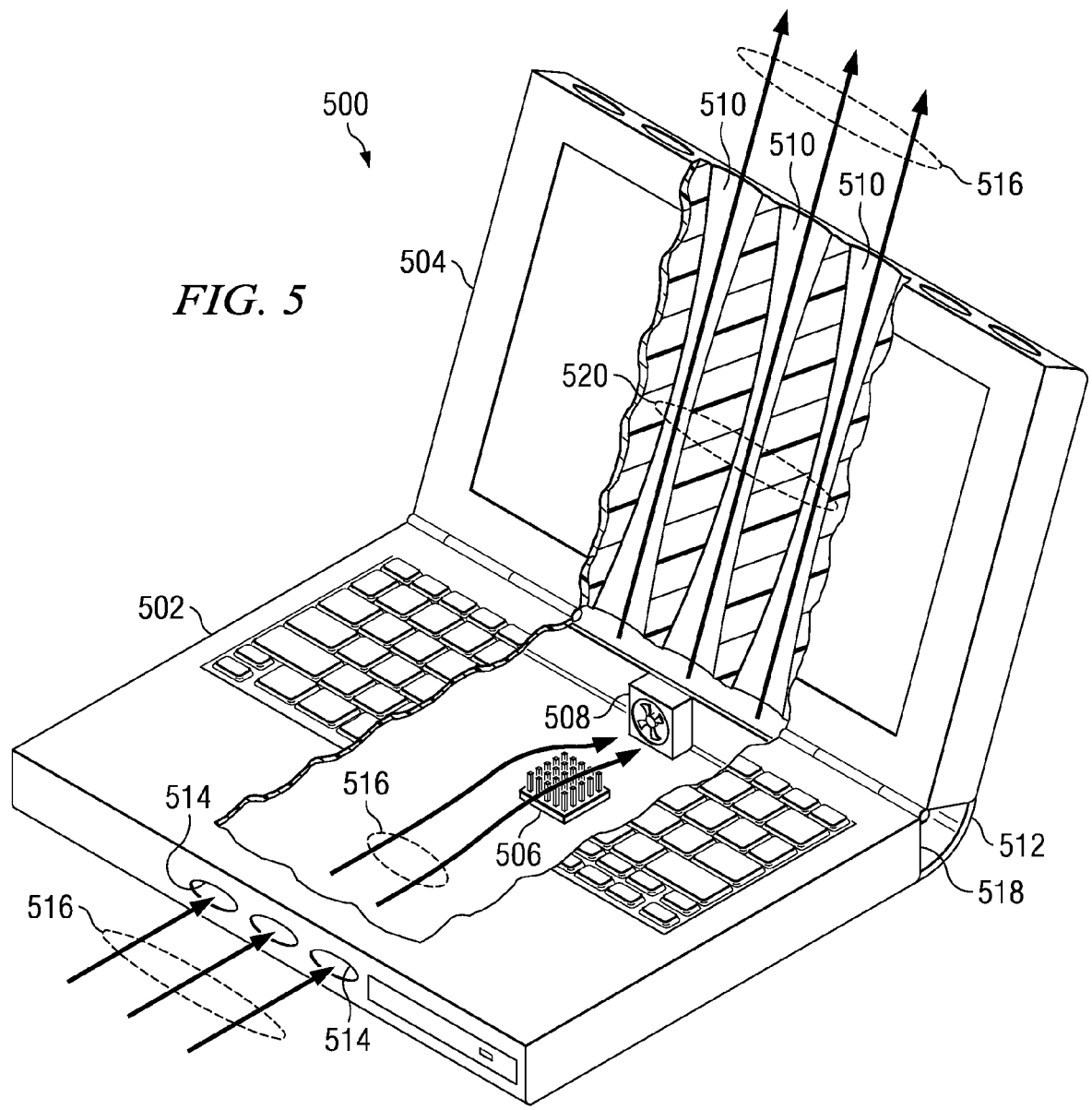
FIG. 5 depicts a three-dimensional view of a laptop computer using a Venturi Bernoulli heat extraction system in accordance with an illustrative embodiment.

FIG. 5 depicts a three-dimensional view of a laptop computer using a Venturi Bernoulli heat extraction system in accordance with an illustrative embodiment. Laptop computer 500 may be a laptop, notebook, or mobile computer, such as mobile computer 100 of FIG. 1. As with laptop computer 400 of FIG. 4, laptop computer 500 is comprised of system unit 502 and video display terminal 504. System unit 502 comprises central processing unit (CPU) 506 and fan 508 used to draw air over a heat sink that sits on top of central processing unit 506 as well as other internal components of system unit 502 forming heated air. While the illustrative embodiments use fan 508, one or more fans may be used to comprise a set of fans. While the illustrative embodiments show one of central processing unit 506, system unit 502 may contain one or more central processing units. The illustrative embodiments provide a Venturi Bernoulli heat extraction system that is comprised of chimney 510 and hinge duct 512. Chimney 510 may be one or more chimneys or tubes using the Venturi effect as described in FIG. 3 and are located behind video display terminal 504.

System unit 502 may comprise one or more air inlets 514 where air 516 is drawn in over the internal components inside of system unit 502 to cool the internal components. Fan 508 may draw air 516 over the internal components of system unit 502, such as central processing unit 506 and exhaust air 516 through air outlet 518. The illustrative embodiments draw air 516 through hinge duct 512 and then through chimney 510. While the illustrative embodiments show hinge duct 512 that provides a connection from air outlet 518 to chimney 510, any type of connection may be used, such as an expandable/collapsible tube as long as the connection is able to conduct air from air outlet 518 to chimney 510 such that a pressure gradient is present.

Air 516 passing through constriction 520 is subject to changes in velocity and pressure in order to satisfy the conservation of mass-flux or flow rate. The reduction in pressure in constriction 520 can be understood by conservation of energy: air 516 gains kinetic energy as it enters constriction 520, and that energy is supplied by a pressure gradient force from behind. The pressure gradient reduces the pressure in constriction 520 in reaction to the acceleration. Likewise, as air 516 leaves constriction 520, air 516 is slowed by a pressure gradient force that raises the pressure back to the ambient level.

Thus, the illustrative embodiments provide a Venturi Bernoulli heat extraction system that uses a chimney-like heat extractor with venturis extending up the back of the LCD screen. Using Venturi Bernoulli heat extraction may augment or replace the fan drawing air over the heat sink that sits on top of the central processing unit.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A laptop computer comprising:
a system unit, wherein the system unit includes a set of heat sources;
a video display unit movably attached to the system unit;
a set of air inlets and a set of air outlets on the system unit, wherein the set of air inlets allows air to flow into the system unit, wherein the air flows over the heat sources within the system unit to form heated air, and wherein the set of air outlets allows the heated air to flow out of the system unit;
a set of tubes located behind a video display within the video display unit, wherein each tube in the set of tubes has an inlet and an outlet in the video display unit;
an air connection, wherein the air connection connects the set of air outlets to each inlet in the set of tubes, wherein the set of tubes have a form such that heated air passing through a constriction in the set of tubes changes in velocity and pressure in order to satisfy conservation of flow rate, and wherein the heated air produced by the set of heat sources is extracted from the laptop computer through each outlet in the set of tubes.

2. The laptop computer of claim 1, wherein the heated air gains kinetic energy as it enters the constriction and wherein the kinetic energy is supplied by a first pressure gradient force of the heated air behind the constriction.

3. The laptop computer of claim 2, wherein the first pressure gradient reduces the pressure in the constriction in reaction to an acceleration.

4. The laptop computer of claim 3, wherein the heated air leaving the constriction is slowed by a second pressure gradient force that raises the pressure back to an ambient level.

5. The laptop computer of claim 1, wherein a number of the set of air inlets, the set of air outlets, and the set of tubes is determined based on an amount of cooling necessary to cool the system unit.

6. The laptop computer of claim 1, wherein the set of air inlets are on a front of the system unit.

7. The laptop computer of claim 1, wherein the set of air outlets are on a rear of the system unit.

8. The laptop computer of claim 1, wherein the set of tubes extend from a bottom of the video display unit to a top of the video display unit.

9. The laptop computer of claim 1, wherein the heated air connection from the set of air outlets to the set of tubes is a hinged duct.

10. The laptop computer of claim 1, wherein the heated air connection from the set of air outlets to the set of tubes is an expandable/collapsible tube.

11. A laptop computer comprising:
a system unit, wherein the system unit includes a set of heat sources;
a video display unit movably attached to the system unit;
a set of air inlets and a set of air outlets on the system unit, wherein the set of air inlets allows air to flow into the system unit, wherein the air flows over the heat sources within the system unit to form heated air, and wherein the set of air outlets allows the heated air to flow out of the system unit;
a set of fans, wherein the set of fans draw air from the set of air inlets and exhaust the heated air through the set of air outlets;
a set of tubes located behind a video display within the video display unit, wherein each tube in the set of tubes has an inlet and an outlet in the video display unit;
an air connection, wherein the air connection connects the set of air outlets to each inlet in the set of tubes, wherein the set of tubes have a form such that heated air passing through a constriction in the set of tubes changes in velocity and pressure in order to satisfy conservation of flow rate, and wherein the heated air produced by the set of heat sources is extracted from the laptop computer through each outlet in the set of tubes.

12. The laptop computer of claim 11, wherein the heated air gains kinetic energy as it enters the constriction and wherein the kinetic energy is supplied by a first pressure gradient force of the heated air behind the constriction.

13. The laptop computer of claim 12, wherein the first pressure gradient reduces the pressure in the constriction in reaction to an acceleration.

14. The laptop computer of claim 13, wherein the heated air leaving the constriction is slowed by a second pressure gradient force that raises the pressure back to an ambient level.

15. The laptop computer of claim 11, wherein a number of the set of air inlets, the set of air outlets, and the set of tubes is determined based on an amount of cooling necessary to cool the system unit.

16. The laptop computer of claim 11, wherein the set of air inlets are on a front of the system unit.

17. The laptop computer of claim 11, wherein the set of air outlets are on a rear of the system unit.

18. The laptop computer of claim 11, wherein the set of tubes extend from a bottom of the video display unit to a top of the video display unit.

19. The laptop computer of claim 11, wherein the heated air connection from the set of air outlets to the set of tubes is a hinged duct.

20. The laptop computer of claim 11, wherein the heated air connection from the set of air outlets to the set of tubes is an expandable/collapsible tube.

* * * * *